US008756241B1

(12) United States Patent
Thite et al.

(10) Patent No.: US 8,756,241 B1
(45) Date of Patent: Jun. 17, 2014

(54) DETERMINING REWRITE SIMILARITY SCORES

(75) Inventors: Shripad V. Thite, San Francisco, CA (US); Dandapani Sivakumar, Cupertino, CA (US)

(73) Assignee: Google Inc., Mountain View, CA (US)

( * ) Notice: Subject to any disclaimer, the term of this patent is extended or adjusted under 35 U.S.C. 154(b) by 137 days.

(21) Appl. No.: 13/567,191

(22) Filed: Aug. 6, 2012

(51) Int. Cl.
    *G06F 17/30* (2006.01)
(52) U.S. Cl.
    USPC .......................................... 707/749; 707/721
(58) Field of Classification Search
    CPC ................... G06F 17/30672; G06F 17/30448; G06Q 30/0251; Y10S 707/99932; Y10S 707/99935
    USPC .................................................. 707/749, 721
    See application file for complete search history.

(56) References Cited

U.S. PATENT DOCUMENTS

| | | | | |
|---|---|---|---|---|
| 5,864,846 | A * | 1/1999 | Voorhees et al. ...................... 1/1 |
| 6,006,225 | A * | 12/1999 | Bowman et al. ...................... 1/1 |
| 6,169,986 | B1 * | 1/2001 | Bowman et al. ...................... 1/1 |
| 7,149,732 | B2 * | 12/2006 | Wen et al. .............................. 1/1 |
| 7,565,627 | B2 * | 7/2009 | Brill et al. ...................... 715/854 |
| 7,689,554 | B2 * | 3/2010 | Jones et al. ............. 707/999.004 |
| 7,689,585 | B2 * | 3/2010 | Zeng et al. ............. 707/999.104 |
| 7,739,264 | B2 * | 6/2010 | Jones et al. .................... 707/713 |
| 7,814,086 | B2 * | 10/2010 | Bartz et al. .................... 707/708 |
| 8,122,022 | B1 * | 2/2012 | Baker ............................ 707/736 |
| 8,280,900 | B2 | 10/2012 | Pickens et al. |
| 8,316,019 | B1 * | 11/2012 | Ainslie et al. ................. 707/733 |
| 8,548,981 | B1 * | 10/2013 | Bhattacharjee et al. ...... 707/713 |
| 8,589,429 | B1 * | 11/2013 | Thirumalai et al. .......... 707/766 |
| 2003/0144994 | A1 * | 7/2003 | Wen et al. .......................... 707/3 |
| 2005/0234972 | A1 * | 10/2005 | Zeng et al. ................. 707/103 R |
| 2006/0117003 | A1 * | 6/2006 | Ortega et al. ...................... 707/4 |
| 2007/0203894 | A1 * | 8/2007 | Jones et al. ........................ 707/3 |
| 2008/0010269 | A1 * | 1/2008 | Parikh ............................... 707/5 |
| 2008/0114721 | A1 * | 5/2008 | Jones et al. ........................ 707/2 |

(Continued)

FOREIGN PATENT DOCUMENTS

WO  WO2006110684 A2  10/2006
WO  WO2007100812 A2  9/2007

OTHER PUBLICATIONS

Antonellis et al., "Simrank++: Query Rewriting through Link Analysis of the Click Graph", In Proceedings of the VLDB Endowment (PVLDB '08), vol. 1, Issue 1, Aug. 2008, pp. 408-421.*

(Continued)

*Primary Examiner* — Phuong Thao Cao
(74) *Attorney, Agent, or Firm* — Fish & Richardson P.C.

(57) ABSTRACT

Methods, systems, and apparatus, including computer program products, for determining rewrite source-rewrite target similarity scores. In one aspect the method includes receiving a rewrite source-rewrite target pair; identifying first queries that include the rewrite source and second queries that include the rewrite target; identifying a first web document referenced by a first search result responsive to the first query; identifying third queries for which the first web document was referenced by a third search result responsive to the third query; identifying a second web document that was referenced by a second search result responsive to the second query; identifying one or more fourth queries for which the second web document was referenced by a fourth search result responsive to the fourth query; and determining a similarity score for the rewrite source-rewrite target pair based on a measure of matching terms between third query terms and fourth query terms.

20 Claims, 7 Drawing Sheets

(56) References Cited

U.S. PATENT DOCUMENTS

| | | | |
|---|---|---|---|
| 2008/0256035 A1* | 10/2008 | Zhang et al. | 707/3 |
| 2009/0132953 A1* | 5/2009 | Reed et al. | 715/781 |
| 2009/0216710 A1* | 8/2009 | Chang et al. | 707/2 |
| 2009/0222321 A1* | 9/2009 | Liu et al. | 705/10 |
| 2009/0248627 A1* | 10/2009 | Shahshahani et al. | 707/3 |
| 2010/0010895 A1* | 1/2010 | Gabrilovich et al. | 705/14.54 |
| 2010/0070506 A1* | 3/2010 | Whang et al. | 707/740 |
| 2011/0047138 A1* | 2/2011 | Dong et al. | 707/706 |
| 2011/0078147 A1* | 3/2011 | Klinkner et al. | 707/740 |
| 2011/0106821 A1* | 5/2011 | Hassanzadeh et al. | 707/749 |
| 2011/0131157 A1* | 6/2011 | Iyer et al. | 706/12 |
| 2011/0131205 A1* | 6/2011 | Iyer et al. | 707/728 |
| 2012/0047151 A1* | 2/2012 | Leggetter et al. | 707/749 |
| 2012/0089456 A1* | 4/2012 | Gupta et al. | 705/14.45 |
| 2012/0166473 A1* | 6/2012 | Ahmadi et al. | 707/769 |
| 2012/0203717 A1* | 8/2012 | Xu et al. | 706/12 |
| 2012/0254217 A1* | 10/2012 | Ali et al. | 707/765 |
| 2012/0254218 A1* | 10/2012 | Ali et al. | 707/765 |
| 2012/0323877 A1 | 12/2012 | Ray et al. | |
| 2013/0024443 A1* | 1/2013 | Achuthan et al. | 707/722 |
| 2013/0132363 A1* | 5/2013 | Dong et al. | 707/706 |
| 2013/0173573 A1* | 7/2013 | Song et al. | 707/706 |
| 2013/0238636 A1* | 9/2013 | Subramanya et al. | 707/749 |
| 2014/0025701 A1* | 1/2014 | Zhu et al. | 707/765 |

OTHER PUBLICATIONS

Malekian et al., "Optimizing Query Rewrites for Keyword-Based Advertising", AMC, In EC '08, Jul. 8-12, 2008, Chicago, Illinois, USA, 10 pages.*

Fu et al., "Query Clustering Using a Hybrid Query Similarity Measure", WSEAS Transaction on Computers, 3(3), 700-705, 2004, 7 pages.*

Zhang et al., "Query Rewriting using Active Learning for Sponsored Search", in Proceedings of SIGIR '07, Jul. 23-27, 2007, Amsterdam, The Netherlands, 2007, 2 pages.*

Qiu et al., "Concept Based Query Expansion", In Proceedings of the 16th Annual International ACM Conference on Research and Development in Information Retrieval (SIGIR '93), 1993, 11 pages.*

Wen et al., "Clustering User Queries of a Search Engine", In WWW10, May 1-5, 2001, Hong Kong, 2001, pp. 162-168 (7 pages).*

\* cited by examiner

DETERMINING REWRITE SIMILARITY SCORES

BACKGROUND

This specification generally relates to targeted advertising.

The Internet provides access to a wide variety of resources, such as text, images, videos, audio files, and other multimedia content. Advertisers can use the Internet as a conduit to provide advertisements to consumers to market the advertisers' products and services. The success of advertisers' advertising campaigns is affected by many factors. For example, the success (e.g., as measured by conversion rate or return on investment) of the campaign can depend, in part, on the targeting criteria with which the advertisements are targeted. For example, an advertiser can often increase the success of its advertising campaign by targeting particular advertisements to consumers likely to be receptive to the advertisements (e.g., providing advertisements to consumers that have an interest in the subject matter of the advertisements).

Some advertisers use keywords to target their advertisements to particular consumer populations. For example, an advertiser selects keywords for an advertisement such that when a consumer causes a search query to be submitted to a search system that includes terms that are related to the advertiser's keyword(s), the advertiser's advertisement is eligible to be presented on a search results page along with search results responsive to the consumer's search query. In this way relevant advertisements can be presented to the consumer based on relationships between the terms of the search query and the advertisement keywords. However, evaluating the quality of such search query term/advertisement keyword relationships, which, in turn, determines which advertisements are presented to a consumer, can be challenging.

SUMMARY

In general, one aspect of the subject matter described in this specification can be embodied in methods that include the actions of receiving data specifying a rewrite source-rewrite target pair that includes a rewrite source and a rewrite target for the rewrite source; identifying one or more first queries that include the rewrite source and one or more second queries that include the rewrite target; for each of the one or more first queries: identifying a first web document that was referenced by a first search result responsive to the first query and requested through a user interaction with the first search result; identifying one or more third queries, different from the first query, each of the third queries being a query for which the first web document was referenced by a third search result responsive to the third query and requested through a user interaction with the third search result; selecting third query terms that are included in one or more of the third queries; for each of the second queries: identifying a second web document that was referenced by a second search result responsive to the second query and requested through a user interaction with the second search result; identifying one or more fourth queries, different from the second query, each of the fourth queries being a query for which the second web document was referenced by a fourth search result responsive to the fourth query and requested through a user interaction with the fourth search result; selecting fourth query terms that are included in one or more of the fourth queries; and determining a similarity score for the rewrite source-rewrite target pair based on a measure of matching terms between the third query terms and the fourth query terms.

Particular embodiments of the subject matter described in this specification can be implemented so as to realize one or more of the following advantages. A similarity score that indicates a measure of semantic similarity between a rewrite source (e.g., a term in a search query) and a rewrite target can objectively be determined. Thus rewrite targets that are likely to be effective at targeting advertisements to consumers who have entered search queries including the rewrite source can be identified to expand the pool of advertisements that are likely to be of interest to the consumers. For example, a consumer enters a search query that includes a single search term (e.g., rewrite source). Based on this single search term, only a few advertisements are identified as being relevant as only those few advertisements have advertisement keywords that match the search term. However, rewrite targets for the search term/rewrite source can be identified based on the similarity scores between the rewrite targets and the search term/rewrite source.

The rewrite targets with the highest similarity scores to the search term/rewrite source can be used to identify additional advertisements to present to the consumer, as such additional advertisements are likely to be relevant to the search term/rewrite source because the rewrite targets are determined to be similar to the search term/rewrite source. Thus the consumer is presented with more relevant advertisements to increase the likelihood the consumer will select one of the advertisements and purchase the advertised products or services thereby increasing an advertiser's return on investment and enhancing the consumer's experience by presenting relevant advertisements.

Each of the advantages above is optional and can be achieved separately or in combination.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Overview

This document describes technologies relating to determining a similarity score for a rewrite. A rewrite is a pair of phrases, a rewrite source and a rewrite target. The rewrite source is one or more terms from a search query submitted to a search system. The rewrite target is one or more terms that can be included with or supplement the rewrite source for use in identifying advertisement keywords and/or advertisements relevant to the rewrite source (or search query more generally). An advertisement keyword is one or more terms that have been designated by an advertiser for use in targeting the advertiser's advertisements to a particular consumer population. The similarity score is a measure of semantic similarity between a rewrite source and a rewrite target.

The similarity score between a rewrite source and a rewrite target for that rewrite source can be determined by comparing query terms in search queries related to search queries that include the rewrite source with query terms in search queries related to search queries that include the rewrite target as a query term. For example, if the rewrite source is "running" and the rewrite target is "hiking" then a search query including "running" is identified, e.g., "running shoes" and a search query including "hiking" is identified, e.g., "hiking shoes," and terms from search queries related to "running shoes" are compared with terms from search queries related to "hiking shoes."

A search query is related to another search query if the same web document is referenced by both a search result responsive to the first search query and a search result responsive to the second search query, and each of the search results has been selected by a user when presented in response to the two queries. For example, a web document, such as a web page for "Bob's Footware," requested as a result of a user selection of a search result responsive to "running shoes" (the query including the rewrite source) is identified.

Related search queries resulting in user selections of search results that also reference "Bob's Footware" are identified. Such related queries are, for example, "men's sock prices" and "men's shoe prices." Thus, the search queries "men's sock prices" and "men's shoe prices" are determined to be related to the search query "running shoes" because a search result responsive to each of those queries referenced "Bob's Footware" and the search result was selected by a user. In a similar manner the search queries "men's hiking" and "men's boots" are determined to be related to the search query including the rewrite target, "hiking shoes." Identifying related search queries can further be described with reference to FIG. 1A, which is a block diagram of example user environment 150.

Figure 1A:
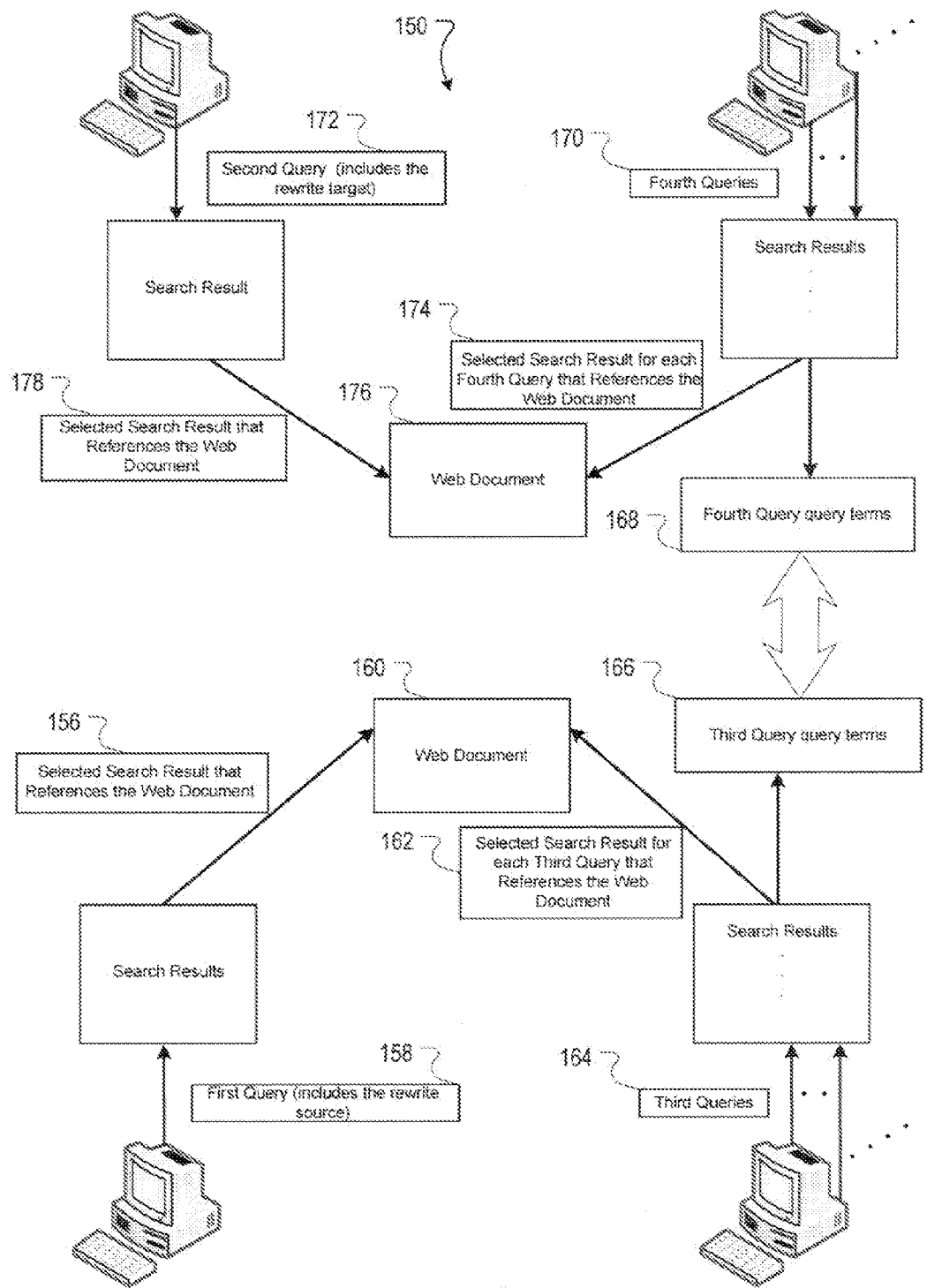
FIG. 1A is a block diagram of example user environment.

With reference to FIG. 1A and continuing with the example above, search result 156 is responsive to a first query 158 (e.g., "running shoes") that includes the rewrite source (e.g., "running") from the rewrite source-rewrite target pair (e.g., "running→hiking") and was selected by a user. Search result 156 is a search result that references a particular web document 160 (e.g., Bob's Footware). Using the particular web document 160, a set of search results 162 that referenced the particular web document 160 is identified, where each search result in the set 162 is another search query (e.g., a respective third query 164 that is different than the first query 158) for which the particular web document 160 was identified as responsive. Each third query 164 (e.g., "running sock prices") is determined to be related to the first query 158 because each of the third queries 164 resulted in a user selection of a search result in the set 162 that referenced the web document 160, which was also referenced by the selected search result 156 responsive to the first query 158 (e.g., "running shoes").

Third query terms 166 are selected from the third queries 164. Each of the third query terms 166 is a term appears in one or more third queries 164. For example, "men" appears in the third queries "men's sock prices" and "men's shoe prices", such that the term "men" can be selected as a third query term.

In a manner similar to that described with reference to the third query terms 166 above, fourth query terms 168 are selected from fourth queries 170, where each of the fourth query terms 168 is a term that appears in one or more fourth queries 170 (e.g., "men" from "men's hiking" and "men's boot"). Each fourth query 170 is determined to be related to the second query 172 (e.g., "hiking shoes") because each of the fourth queries 170 resulted in a user selection of a search result 174 referencing the web document 176, which was also referenced by the selected search result 178 responsive to the second query 172. However, other methods can also be used to determine related queries.

A similarity score for a rewrite (e.g., "running" "hiking") is determined based on a comparison of the query terms in the respective related queries (e.g., a comparison of the third query terms 166 and the fourth query terms 168). This comparison, for example, can include identifying matching query terms from the related search queries (e.g., identifying "men" as a matching term because "men" is included in both the third query terms 166 from the third queries 164 and the fourth query terms 168 from the fourth queries 170). In some implementations, the comparison of the query terms in the respective related queries to determine a similarity score for the rewrite includes a comparison of histograms for the related search queries.

In some implementations, for example, for a rewrite having a similarity score that is above a minimum threshold, the rewrite source can be replaced within a query by the rewrite target to give rise to an expanded set of advertising keywords that can be used to select advertisements to provide with search results responsive to search queries that include the rewrite source. For example, for the rewrite source "running shoes" and the rewrite target "hiking boots," occurrences of "running shoes" in search queries are rewritten by "hiking boots." Thus, for example, the search query "brand x running shoes" gives rise, by being rewritten, to the set of expanded keywords that include "brand x hiking boots" or "hiking boots." These expanded keywords can also be used to identify advertisements for search queries including "running shoes." Determining similarity scores is described in more detail below.

§2.0 Example Environment

Figure 1B:
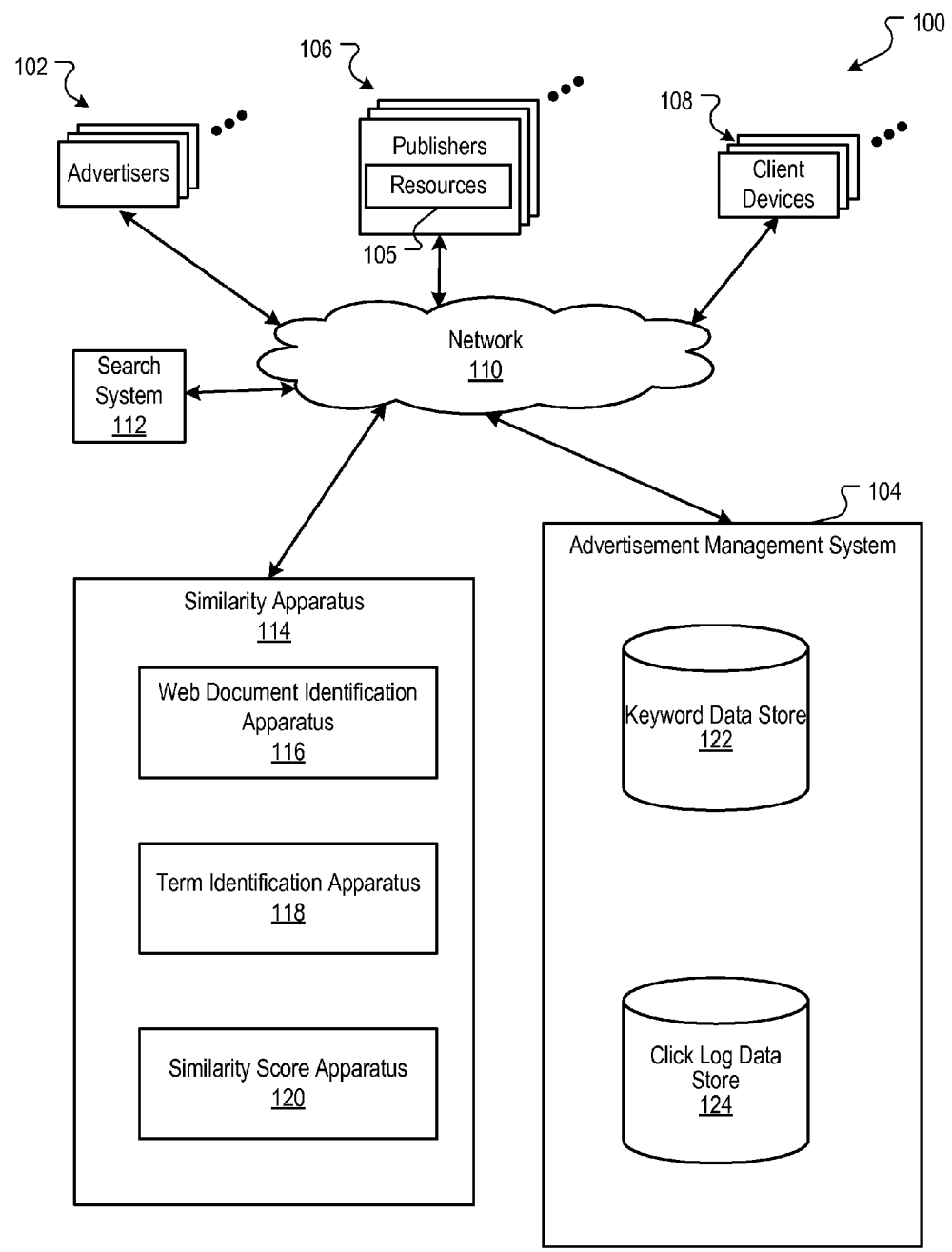
FIG. 1B is a block diagram of an example environment in which a similarity apparatus can be implemented.

FIG. 1B is a block diagram of an example environment in which a similarity apparatus 114 can be implemented. The online environment 100 can facilitate the identification and serving of web documents, e.g., web pages, advertisements, etc., to users. A computer network 110, such as a local area network (LAN), wide area network (WAN), the Internet, or a combination thereof, connects advertisers 102, an advertisement management system 104, publishers 106, a search system 112 and client devices 108. The online environment 100 may include numerous advertisers 102, publishers 106 and client devices 108.

One or more advertisers 102 can directly, or indirectly, enter, maintain, and track advertisement information in the advertising management system 104. The advertisements can be in the form of graphical advertisements, such as banner advertisements, text only advertisements, image advertisements, audio advertisements, video advertisements, advertisement gadgets with or without interactive features, advertisements combining one of more of any of such components, etc., or any other type of electronic advertisement document. The advertisements may also include embedded information, such as a links, meta-information, and/or machine executable instructions, such as HTML or a script.

A publisher 106 is any web site that hosts and provides electronic access to a resource 105 (e.g., web document) by use of the network 110. A web site is one or more resources 105 associated with a domain name. An example web site is a collection of web pages formatted in hypertext markup language (HTML) that can contain text, graphic images, multimedia content, and programming elements, such as scripts.

A resource 105 is any data that can be provided by the publisher 106 over the network 110 and that is associated with a resource address. Resources 105 include HTML pages, word processing documents, and portable document format (PDF) documents, images, video, and feed sources, to name just a few. The resources 105 can include content, such as words, phrase, pictures, videos, and so on, and may include embedded information (such as meta information and hyperlinks) and/or embedded instructions (such as scripts).

A client device 108 is an electronic device that is under the control of a user and is configured to request and receive data over the network 110. A client device 108 typically includes a user application, such as a web browser, to facilitate the sending and receiving of data over the network 110, such as requesting a resource 105 from a publisher 106. Example client devices 108 include personal computers, mobile communication devices, and other devices that can send and receive data over the network 110.

When a resource 105 is requested, an advertisement request for one or more advertisements can be submitted to the advertisement management system 104. The advertisement requests can also include resource request information. This information can include the resource 105 itself, a category corresponding to the resource (e.g., arts, business, computers, arts-movies, arts-music, etc.), part or all of the resource request, resource age, resource type (e.g., text, graphics, video, audio, mixed media, etc.), geo-location information, etc.

The advertisement management system 104 responds by sending data for the advertisements to the requesting publisher 106 for provisioning with one or more of the publisher's resources 105. Alternatively, the advertisement management system 104 responds by sending data for the advertisement directly to the client device 108 in response to a client device request for a resource 105, typically via embedded instructions (e.g., a script) received by the client device 108 from the publishers 106. The advertisements can include embedded links to landing pages, i.e., pages on the advertisers' websites that a user is directed to when the user interacts with (e.g., clicks or hovers a pointer over) an advertisement presented on a publisher website.

To facilitate searching of the resources 105, the environment 100 includes a search system 112 that identifies the resources 105 by crawling and indexing the resources 105 provided by the publishers 106. Data about the resources 105 can be indexed based on the resource 105 to which the data corresponds. The indexed and, optionally, cached copies of the resources can be stored in an indexed data store.

Client devices 108 can submit search queries to the search system 112 over the network 110. In response, the search system 112 accesses the indexed data store to identify resources 105 that are determined to be relevant to the search query (e.g., based on information retrieval (IR) scores for the resources 105). The search system 112 identifies the relevant resources 105 in the form of search results and returns the search results to the client devices 108. A search result is data generated by the search system 112 that identifies a resource 105 that is responsive to a particular search query, and includes a link to the resource 105.

In some implementations, keywords associated with a requested resource 105 or a search query for which search results are requested are provided to the advertisement management system 104 to facilitate identification of advertisements that are relevant to the resource 105 or search query, as the case may be. The advertisement management system 104 can, for example, compare keywords associated with the requested resource 105 or search query to keywords selected by an advertiser for an advertisement and identify advertisements as relevant to the requested resource 105 or search query based on the comparison. It is often desirable to expand the set of advertisement keywords relevant to a search query to increase the effectiveness of delivering advertisements to a desired consumer population. However, selecting effective rewrite targets to expand the set of advertisement keywords relevant to a search query can be challenging. As described below, the similarity apparatus 114 can address this challenge.

§3.0 Similarity Score Determination

The similarity apparatus 114 determines similarity scores for rewrite source-rewrite target pairs. In some implementations, the similarity apparatus 114 includes a web document identification apparatus 116, a term identification apparatus 118 and a similarity score apparatus 120.

Figure 2A:
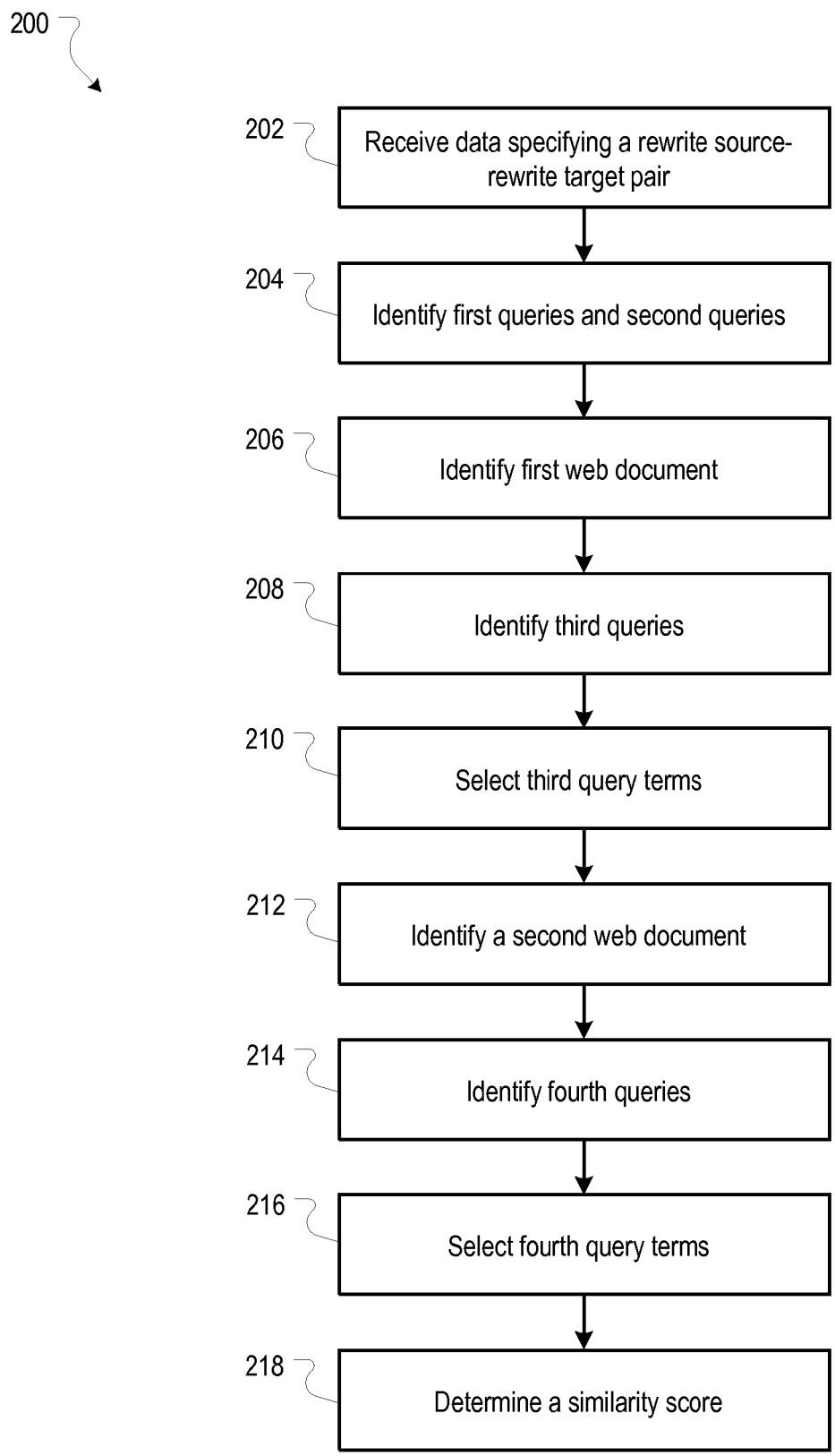
FIG. 2A is a flow diagram of an example process for determining similarity scores.

One example process by which the similarity apparatus 114 determines similarity scores for rewrite source-rewrite target pairs is described with reference to FIG. 2A, which is a flow diagram of an example process 200 for determining similarity scores.

The process 200 receives data specifying a rewrite source-rewrite target pair that includes a rewrite source and a rewrite target for the rewrite source (202). For example, the web document identification apparatus 116 receives or accesses data specifying a rewrite source-rewrite target pair from the keyword data store 122. The keyword data store 122 stores data specifying numerous rewrite source-rewrite target pairs. A rewrite source and a rewrite target can be identified as a rewrite source-rewrite target pair based on known relationships, e.g., the rewrite source and rewrite target are synonyms or are contextually related. For example, the rewrite source "running" can be paired with the rewrite target "hiking" to form the rewrite source-rewrite target pair as both "running" and "hiking" describe outdoor activities. Alternatively, or additionally, a rewrite source-rewrite target pair can be arbitrarily paired together without reliance on a known relationship.

The process 200 identifies one or more first queries that include the rewrite source and one or more second queries that include the rewrite target (204). For example, the web document identification apparatus 116, of FIG. 1 can identify one or more first queries that include the rewrite source and one or more second queries that include the rewrite target. The web document identification apparatus 116 can identify first queries by requesting and analyzing data from the click log data store 124 specifying search queries that include the rewrite source. For example, for the rewrite source "running" the web document identification apparatus 116 requests data from the click log data store 124 specifying search queries that include the query term "running." In response to the request, the web document identification apparatus 116 receives data that specifies the first queries. For example, the first queries are "running shoes," "running trails" and "running apparel."

In some implementations, the web document identification apparatus 116 receives data that specify numerous queries that include the rewrite source as a query term, and the web document identification apparatus 116 selects only a predefined number of the queries to analyze (e.g., the N most popular queries) or only those queries that satisfy some threshold (e.g., the query is submitted more than X times during a given time period).

In some scenarios, the rewrite source is a phrase including multiple terms and the rewrite target is a phrase including multiple terms. In such scenarios, the click log data store 124 may not include data for queries including all of the terms in the phrase (e.g., a long phrase). If the click log data store 124 does not contain a query with all of the phrase terms, the web identification apparatus 116 partitions the phrase into phrase subsets (i.e., n-grams having fewer terms than the phrase) and treats each subset as a rewrite source for purposes of identifying corresponding first queries (which, as described below, can later be aggregated to determine a similarity score for the rewrite source-rewrite target pair). For example, if the rewrite source is a phrase such as "running shoes with great arch support," the web document identification apparatus 116 can partition the keyword phrase into "running shoes" and "great arch support." The web document identification apparatus can treat a rewrite target with multiple terms in a similar manner.

The web document identification apparatus 116 can identify second queries in a manner similar to that described above with reference to the identification of the first queries. For example, the web document identification apparatus 116 can identify "hiking shoes," "hiking trails" and "hiking apparel" as the second queries.

In some implementations, the second queries correspond to the first queries. As such, a second query will have the same query terms as the corresponding first query but the rewrite source in the first query is replaced by the rewrite target in the second query. For example, the queries resulting from replacing "running" with "hiking" in the first queries are the same as the second queries (e.g., the second query "hiking shoes" corresponds to the first query "running shoes"). However, the first queries and the second queries do not have to be limited to this convention and can differ in other respects.

In some implementations, the click log data store 124 not only stores search queries received by the search apparatus 112 but also stores click data including data specifying user selections (e.g., clicks) of advertisements provided by the advertisement management system 104, user selections of search results responsive to the search queries, and the web documents to which the selected search results refer.

The process 200 identifies a first web document that was referenced by a first search result responsive to the first query and requested through a user interaction with the first search result (206). For example, the web document identification apparatus 116 identifies the first web document by requesting and analyzing data from the click log data store 124 specifying selected search results, responsive to the first query, that reference the first web document. In some implementations, the first web document is a resource 105. For example, for the first query "running shoes," the web document identification apparatus 116 requests and analyzes click log data from the click log data store 124 specifying search results responsive to "running shoes" that were selected by users.

The web document identification apparatus 116 parses the requested click log data to identify the web documents that were referenced by the selected search results (and subsequently provided to the users). For example, the web document identification apparatus 116 identifies the "A1 Athletics" web page (i.e., the web document) as being referenced by a particular selected search result responsive to the first query "running shoes." In other words, in response to the search query "running shoes" the search system 112 returned a search result for "A1 Athletics" and this search result was selected by a user. The web document identification apparatus 116 can identify many different web documents referenced by many different search results responsive to the first query. In some implementations, the web document identification apparatus 116 only identifies web documents that were referenced by a threshold number of search results (e.g., the web document was referenced by at least X selected search results or was referenced by at least Y percent of the selected search results).

The process 200 identifies one or more third queries, different from the first query (208). Each of the third queries is a query for which the first web document was referenced by a third search result responsive to the third query and requested through a user interaction with the third search result. In some implementations, the web document identification apparatus 116 identifies third queries. For example, the web document identification apparatus 116 parses the requested click log data to identify search queries that resulted in the search system 112 returning search results referencing the first web document that were selected by users.

Continuing with the above example, the web document identification apparatus 116 identifies search queries (i.e., third search queries) that resulted in search results referencing the "A1 Athletics" web page (i.e., the first web document) being selected by users. Thus, each of these identified third search queries resulted in a search result referencing the "A1 Athletics" web page that was selected by a user. In some implementations, the web document identification apparatus 116 selects or identifies only those third queries that satisfy some threshold (e.g., the N most popular queries that referenced the first web document and were selected by a user).

The process 200 selects third query terms that are included in one or more of the third queries (210). In some implementations, the term identification apparatus 118 selects third query terms that are included in one or more of the third queries. The term identification apparatus 118 analyzes the third search queries identified by the web document identification apparatus 116 and selects a term that is included or terms that are included in the third queries. For example, the term identification apparatus 118 selects "running," "shoes," "reviews," "sport," "best," "prices," "men" and "women" as third query terms as each of the terms is included in one or more of the third queries.

In some implementations, the term identification apparatus 118 can identify variations of a query term across multiple third search queries and account for these variations in its selection of third query terms. For example, the variations can be plural or singular versions of the query term, a root of the query term, an expansion or contraction of the query term or otherwise identified or identifiable as a variation of the query term (e.g., as specified in a variation listing data store).

The process 200 identifies a second web document that was referenced by a second search result responsive to the second query and requested through a user interaction with the second search result (212). In some implementations, the web document identification apparatus 116 identifies a second web document that was referenced by a second search result responsive to the second query and requested through a user interaction with the second search result. For example, for the second query "hiking shoes," web document identification apparatus 116 requests and analyzes click log data from the click log data store 124 specifying search results responsive to "hiking shoes" that were selected by users. In a manner similar to that described in process 206, the web document identification apparatus 116 parses the requested click log data for the search results responsive to the second query to identify the web documents that were referenced by selected search results. For example, the web document identification apparatus 116 identifies the "XYZ Outdoor World" web page (i.e., the web document) as being referenced by a particular selected search result responsive to the second query "hiking shoes."

The web document identification apparatus 116 can identify many different web documents referenced by many different search results responsive to the second query. In some implementations, the web document identification apparatus 116 only identifies web documents that were referenced by a threshold number of search results (e.g., the web document was referenced by at least X selected search results or was referenced by at least Y percent of the selected search results).

The process 200 identifies one or more fourth queries, different from the second query, each of the fourth queries being a query for which the second web document was referenced by a fourth search result responsive to the fourth query and requested through a user interaction with the fourth search result (214). In some implementations, the web document identification apparatus 116 identifies fourth queries. For example, the web document identification apparatus 116 parses click log data (e.g., requested or accessed from the click log data store 124) to identify search queries (e.g., fourth search queries) that resulted in the search system 112 returning search results, referencing the second web document (e.g., the "XYZ Outdoor World" web page), that were selected by users.

Continuing with the above example, the web document identification apparatus 116 identifies fourth search queries that resulted in search results referencing the "XYZ Outdoor World" web page being selected by users. Thus, each of the fourth search queries "resulted in a search result referencing the "XYZ Outdoor World" web page that was selected by a user. In some implementations, the web document identification apparatus 116 selects or identifies only those fourth queries that satisfy some threshold (e.g., the N most popular queries that referenced the second web document and were selected by a user).

The process 200 selects fourth query terms that are included in one or more of the fourth queries (216). In some implementations, the term identification apparatus 118 selects fourth query terms that are included in one or more of the fourth queries. The term identification apparatus 118 analyzes the fourth search queries identified by the web document identification apparatus 116 and selects a term that is included or terms that are included in the fourth queries. For example, the term identification apparatus 118 selects "hiking," "boots," "men" and "women" as fourth query terms as each of the terms is included in one or more of the fourth queries.

In a manner similar to that described above with reference to process 210, in some implementations, the term identification apparatus 118 can identify variations of a query term across multiple fourth search queries and account for these variations in its selection of fourth query terms.

The process 200 determines a similarity score for the rewrite source-rewrite target pair based on a measure of matching terms between the third query terms and the fourth query terms (218). A similarity score is a measure of semantic similarity between the rewrite source and the rewrite target. The measure of similarity specifies the strength of the semantic relationship between the rewrite source and the rewrite target such that a high similarity score indicates the rewrite targets is a good proxy for the rewrite source in, for example, targeted advertising. In some implementations, the similarity score apparatus 120 determines a similarity score for the rewrite source-rewrite target pair based on a measure of matching terms between the third query terms and the fourth query terms. A matching term is a term or a variation of the term that is included in both the third query terms and the fourth query terms. For example, if a term is in the third query term set and that same term or a variation of the term is in the fourth query term set then the similarity score apparatus 120 determines the term to be a matching term. For the third query term set of "running," "shoes," "reviews," "sport," "best," "prices," "men" and "women," and the fourth query term set of "hiking," "boots," "men" and "women" the similarity score apparatus 120 determines that "men" and "women" are matching terms as they are in both the third and fourth query term set. Although in the above example the similarity score apparatus 120 determined that only "men" and "women" were matching terms, in many scenarios numerous matching terms are identified from the third and fourth query terms.

The similarity score can be based on the number of matching terms, and alternatively, or in addition, the number of third search queries in which each matching term is included and the number of fourth search queries in which the same matching term is included. For example, a rewrite source-rewrite target pair having matching term A included in eight of ten third queries and in all seven fourth queries and matching term B included in twelve of fourteen third queries and in fifteen of eighteen fourth queries will have a higher similarity score than a rewrite source-rewrite target pair having matching term A included in two of twenty third queries and in one of five fourth queries.

More generally, the matching terms can be determined from probability distributions (or histograms) of the third and fourth query terms and the similarity score can be determined from the probability distributions of the third and fourth query terms considered as vectors. For example, consider that there were seventy-seven third search queries and the below third query search terms had the following frequency, where the frequency is the number of third search queries in which a third search query term appeared:

| | |
|---|---|
| running: | 28 |
| shoes: | 26 |
| reviews: | 3 |
| sports: | 2 |
| best: | 4 |
| prices: | 1 |
| men: | 8 |
| women: | 5 |

In some implementations, the probability distribution of a third search query term is the quotient of the frequency of the third search query term and the total number of third search queries. As such, the probability distributions for the third query search terms (rounded to the nearest hundredth) are:

| | |
|---|---|
| running: | 28/77 = 0.36 |
| shoes: | 26/77 = 0.34 |
| reviews: | 3/77 = 0.04 |
| sports: | 2/77 = 0.03 |
| best: | 4/77 = 0.05 |
| prices: | 1/77 = 0.01 |
| men: | 8/77 = 0.10 |
| women: | 5/77 = 0.06 |

In some implementations, the similarity score apparatus 120 disregards or removes third query search terms that are included in the corresponding first search query from the probability distributions for the third search query terms. For example, if the first search query includes the terms "running" and "shoes" then the similarity score apparatus 120 would remove "running" and "shoes" from the corresponding set of third query search terms.

With respect to the fourth search query terms, for example, consider that there were fifty-one fourth search queries and the below fourth query search terms had the following frequency, where the frequency is the number of fourth search queries in which a fourth search query term appeared:

| | |
|---|---|
| hiking: | 23 |
| boots: | 21 |
| men: | 3 |
| women: | 4 |

As described above, in some implementations, the probability distribution for a fourth search query term is the quotient of the frequency of the fourth search query term and the total number of fourth search queries. As such, the probability distributions for the fourth query search terms (rounded to the nearest hundredth) are:

| | |
|---|---|
| hiking: | 23/51 = 0.45 |
| shoes: | 21/51 = 0.41 |
| men: | 3/51 = 0.06 |
| women: | 4/51 = 0.08 |

The probability distributions for the third and fourth search query terms can be represented as a histogram, which is described below with reference to FIG. 2B.

Figure 2B:
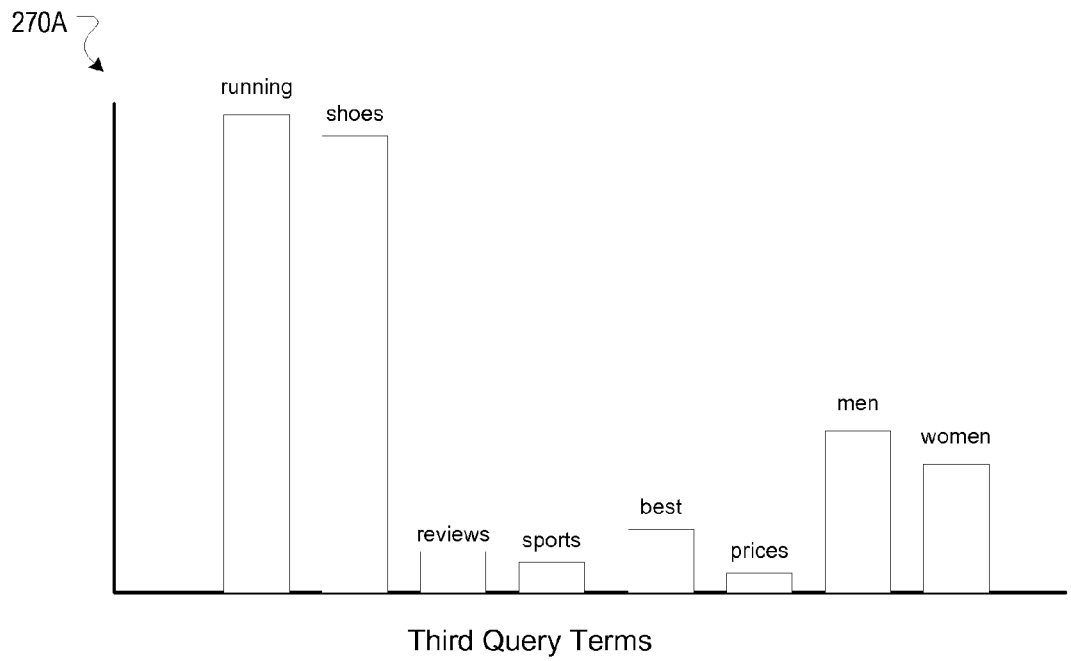
FIG. 2B depicts example histograms of the third and fourth query terms.
Figure 2B:
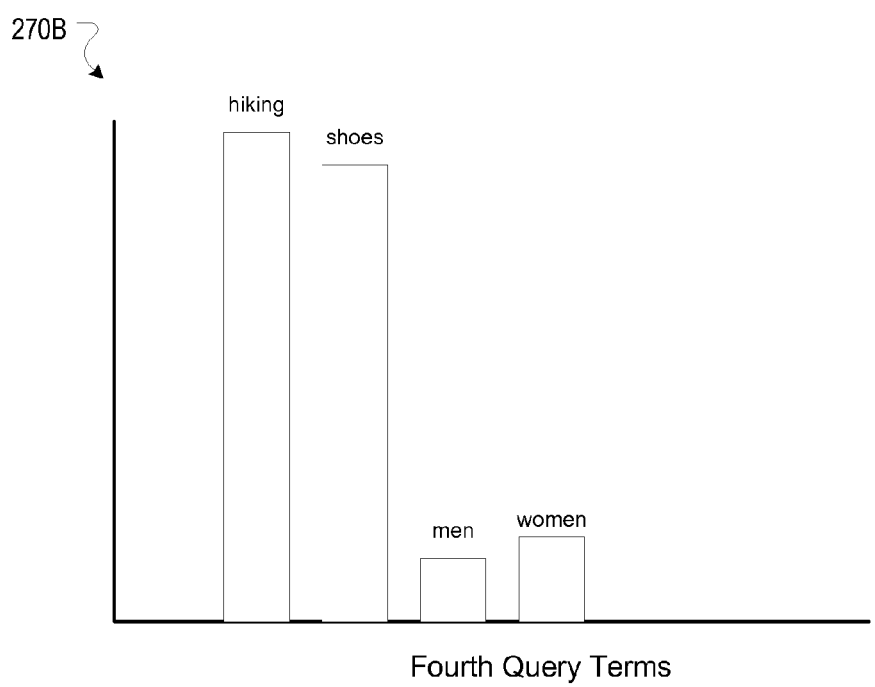

FIG. 2B depicts example histograms 270A and 270B of third and fourth query terms, respectively. In some implementations, similarity score apparatus 120 generates histograms 270A and 270B. Histogram 270A is a probability distribution of the third query terms "running," "shoes," "reviews," "sport," "best," "prices," "men" and "women," with the vertical axis representing the number of different third search queries in which a third query term is included (i.e., the frequency of the term) with respect to the total number of third search queries. For each third query term, the similarity score apparatus 120 generates third query term frequency data that quantify the frequency with which the third query term occurs in the third queries.

Histogram 270B is a probability distribution of the fourth query terms "hiking," "boots," "men" and "women" with the vertical axis representing the number of different fourth search queries in which a fourth query term is included with respect to the total number of fourth search queries. For each fourth query term, the similarity score apparatus 120 generates fourth query term frequency data that quantify the frequency with which the fourth query term occurs in the fourth queries. Thus, the similarity score apparatus 120 can determine the similarity score for a rewrite source-rewrite target pair based on the number of the matching terms and the frequencies from the third query term frequency data and the fourth query term frequency data. For example, in some implementations, the similarity score for a rewrite source-rewrite target pair for a first query is determined according to Relationship 1:

$$\text{Similarity Score} = \frac{\sum_{k=1}^{N} (\text{PD\_third\_X}_k) * (\text{Pd\_fourth\_X}_k)}{L2\_\text{Norm\_PD3} * L2\_\text{Norm\_PD4}}$$

where:
$X_1$ is the first matching term and $X_N$ is the last matching term;

PD_third_$X_k$ is the probability distribution of the matching term $X_k$ in the third queries;
PD_fourth_$X_k$ is the probability distribution of the matching term $X_k$ in the fourth queries;
L2_Norm_PD3 is the L2 Norm of the probability distribution of all third queries; and
L2_Norm_PD4 is the L2 Norm of the probability distribution of all fourth queries.

Based on histograms 270A and 270B, the similarity score for the rewrite source-rewrite target pair running-hiking, according to Relationship 1 is 0.2 (i.e., the only matching terms are "men" and women so the numerator is 0.01 (i.e., (0.10*0.06) for "men"+(0.06*0.08) for women) and the denominator is 0.32 (i.e., 0.51 (L2_Norm_PD3)*0.62 (L2_Norm_PD4)) and the similarity score is 0.01/0.32=0.03.

Figure 3:
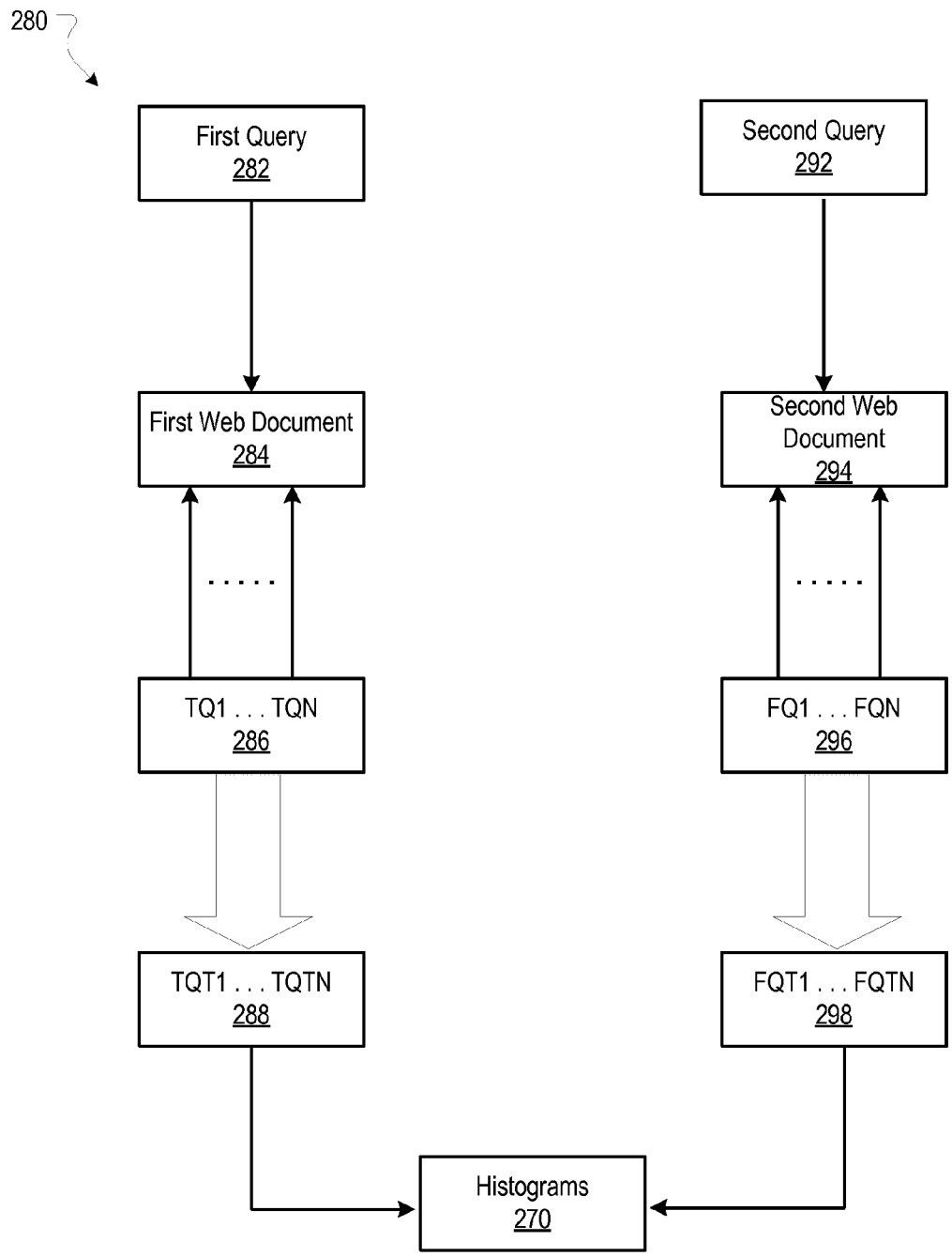
FIG. 3 is a block diagram of an example process for generating query term histograms.

The process 200 can also be described, in part, with reference to FIG. 3, which is a block diagram of an example process for generating query term histograms. First query 282 and second query 292 are identified by the web document identification apparatus 116 in accord with process 204. The first web document 284 is identified by the web document identification apparatus 116 in accord with process 206. The other web document 294 is identified by the web document identification apparatus 116 in accord with process 212. Third queries 286 (third query 1, TQ1, through third query N, TQN) are identified by web document identification apparatus 116 in accord with process 208, and fourth queries 296 (fourth query 1, FQ1, through fourth query N, FQN) are identified by web document identification apparatus 116 in accord with process 214.

Third query terms 288 (third query term 1, TQT1, through third query term N, TQTN) are selected by the term identification apparatus 118 in accord with process 210, and fourth query terms 298 (fourth query term 1, FQT1, through fourth query term N, FQTN) are selected by the term identification apparatus 118 in accord with process 216. Histograms 270A and 270B are generated by the similarity score apparatus 120 based on the third queries terms 288 and the fourth query terms 298.

The process 200 describes determining a similarity score for a rewrite source-rewrite target pair for a particular first query. As there may be numerous first queries for a rewrite source-rewrite target pair, the similarity score apparatus 118 can determine similarity scores for each first query for the rewrite source-rewrite target pair and then determine an overall similarity score for the rewrite source-rewrite target pair based on the similarity scores for the rewrite source-rewrite target pair for each of the first queries. For example, the similarity score apparatus 118 can average the similarity scores from each first query of the rewrite source-rewrite target pair to determine the overall similarity score (e.g., average the similarities scores stemming from each of the first queries "running shoes," "running trails" and "running apparel").

In some implementations, the similarity score apparatus 118 weights the similarity scores from each first query of the rewrite source-rewrite target pair in determining the overall similarity score. In some implementations, the similarity score apparatus 118 first weights each similarity score based on the respective number of user selections of search results from the third and fourth queries and then averages the scores (e.g., aggregates the number user selections of search results from the third and fourth queries for use as the weighting factor). For example, if there were twice as many search results selections (e.g., search result clicks) from the third and fourth queries for the first query "running shoes" as there were for the first query "running trails" then the similarity score apparatus 118 weights the similarity score from the first query "running shoes" twice as much (or in proportion to) as the similarity score from the first query "running trails."

In some implementations, the similarity score apparatus 120 determines a confidence score for each rewrite source-rewrite target pair based on the number of matching terms (e.g., common terms) between the third query terms and the fourth query terms. The confidence score is a measure of the confidence of the accuracy and reliability of the similarity score. In some implementations, the similarity score apparatus 120 determines the confidence score by determining the union of the third query terms and the fourth query terms and setting the confidence score as the ratio of the number of matching terms to the number of query terms in the union. For example, the union of the third query terms "running," "shoes," "reviews," "sport," "best," "prices," "men" and "women," and the fourth query terms "hiking," "boots," "men" and "women" is "running," "shoes," "reviews," "sport," "best," "prices," "men" and "women," "hiking," "boots." The union includes ten query terms. As such, the similarity score apparatus 120 determines the confidence score to be 2/10=0.2. In some implementations, the confidence score can be based on the Jaccard coefficient of the probability distributions of the third and fourth query terms (e.g., histograms 270A and 270B).

Figure 4:
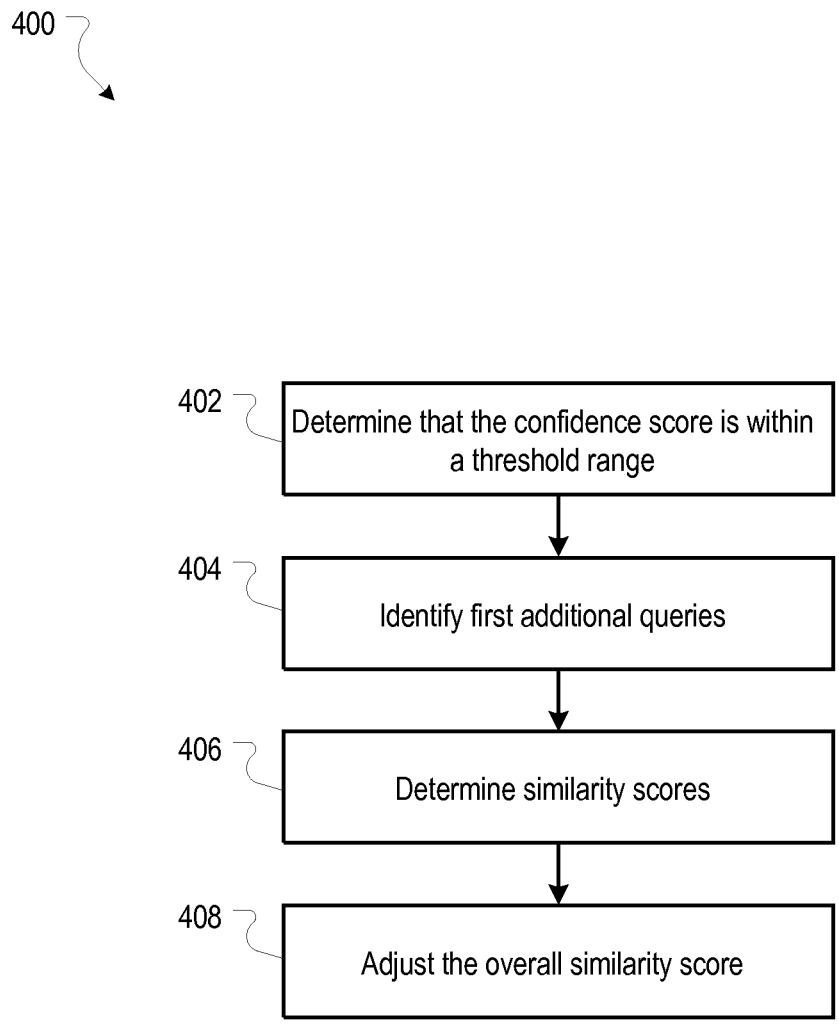
FIG. 4 is a flow diagram of an example process for refining a similarity score.

In some scenarios the confidence score may be within a threshold range indicating a low confidence in the accuracy and reliability of the similarity score. In such scenarios the similarity apparatus 114 can increase the size of the data set used to determine the similarity score (e.g., the number of first queries) in an effort to move the confidence score out of the threshold range, as described with reference to FIG. 4, which is a flow diagram of an example process 400 for refining a similarity score.

The process 400 determines whether the confidence score is within a threshold range (402). For example, the similarity score apparatus 120 determines that the confidence score is within a threshold range. The threshold range can be any interval that includes a range of confidence scores that indicate a low confidence in the similarity score (e.g., confidence scores less than or equal to 0.15).

The process 400, in response to determining that the confidence score is within a threshold range, identifies additional first queries not in the one or more first queries (404). For example, the web document identification apparatus 116 identifies additional first queries not in the one or more first queries (e.g., identifies queries other than the first queries "horse rides," "horse stables" and "types of horse breeds" that include the keyword) in a manner similar to that described in process 204.

In response to determining that the confidence score is within a threshold range, the process 400 determines similarity scores for the rewrite source-rewrite target pair for the additional first queries (406). For example, the similarity score apparatus 120 determines similarity scores for the rewrite source-rewrite target pair for the additional first queries in a manner similar to that described in process 218.

In response to determining that the confidence score is within a threshold range, he process 400 adjusts the overall similarity score based on the similarity scores for the rewrite source-rewrite target pair for the additional first queries (408). For example, the similarity score apparatus 120 adjusts the overall similarity score based on the similarity scores for the rewrite source-rewrite target pair for the additional first queries. The similarity score apparatus 120 can adjust the overall similarity score by setting the adjusted overall similarity score as the average of the similarity scores from the one or more first queries (e.g., "horse rides," "horse stables" and "types of horse breeds") and the additional first queries.

The similarity score apparatus 120 can re-calculate the confidence score based on the one or more first queries and the additional first queries. In some implementations, if the re-calculated confidence score is still in the threshold range, the similarity apparatus 114 can iterate through process 400 until the confidence is out of the threshold range or until a predetermined number of iterations have been completed.

If a rewrite source-rewrite target pair has a similarity score (e.g., an overall similarity score) and a confidence score that are each in a range, for example, desired by or acceptable to the advertiser, then the rewrite target can be used to expand the keyword's reach such that advertisements responsive to the rewrite target are determined to be responsive to the rewrite source. For example, for the rewrite source "horse" and the rewrite target "pony," an advertisement responsive to "pony" will also be determined to be responsive to "horse," even if the advertisement is not otherwise responsive to "horse."

Although the process 200 has been described with reference to web documents being web pages referenced by search results and selected by users, process 200 is equally applicable to web documents being web pages (e.g., landing pages) referenced by advertisements that are presented along with search results, or otherwise presented on a web page and selected by users.

In some implementations, the similarity apparatus 114 ranks or scores a set of rewrites based on their respective similarity scores (e.g., determines histogram scores for the rewrites as described below). Ranking/scoring rewrites can be used, for example, to generate a prioritization scheme for determining an order of rewrite candidates to apply for a given search query as there may be requirements that limit the number of rewrites that can be used (e.g., to cap system processing and storage burdens to maintain a desired system performance level).

Ranking/scores rewrites can also be used to determine which rewrites are eligible to be used for selecting advertisements. For example, in some implementations, there may be a minimum score threshold or ranking and rewrites that do not have scores or rankings, as the case may be, that exceed the threshold are determined not to be eligible to be used to select advertisements.

The similarity apparatus 114 can rank or score rewrites in numerous ways. In some implementations, the similarity apparatus 114 iterates over each search query Q containing the rewrite source (e.g., "running") for a rewrite (e.g., the N most popular search queries including the rewrite source). For each search query Q, the similarity apparatus 114 can determine a weight $w_Q$ (e.g., based on an analysis of click log data 124) that represents the probability of the search query Q occurring during a given future time period.

For each search query Q, the similarity apparatus 114 replaces the rewrite source by the rewrite target (e.g., "hiking") to generate a respective search query Q'. The similarity apparatus 114 determines the similarity score between search queries Q and Q' (e.g., as described above with reference to the process 200). The similarity apparatus 114 then determines the product of the similarity score and $w_Q$ ("Weighted Score"). This process is repeated for all search queries Q including the rewrite source (e.g., the N most popular search queries Q including the rewrite source).

The similarity apparatus 114 aggregates the Weighted Scores for all such search queries Q to determine a histogram score for the rewrite (e.g., for ranking the rewrite). For example, in some implementations, the histogram score for a rewrite is determined according to Relationship 2:

$$\text{Histogram Score} = \frac{\sum_{k=1}^{N} \text{Weighted Score}_k}{N}$$

where:

Weighted Score$_k$ is the Weighted Score for search queries $Q_k$ and $Q_k'$; and N is the number of search queries Q.

Thus, in some implementations, the histogram score for the rewrite is an average of the Weighted Scores for all of the search queries Q for the rewrite. Similar to that described above with respect to similarity scores, in some implementations the confidence in the histogram score can be based on the Jaccard coefficient between search queries Q and Q' (e.g., the weighted average over all pairs (Q, Q') of the Jaccard similarity coefficient between Q and Q').

§4.0 Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 5:
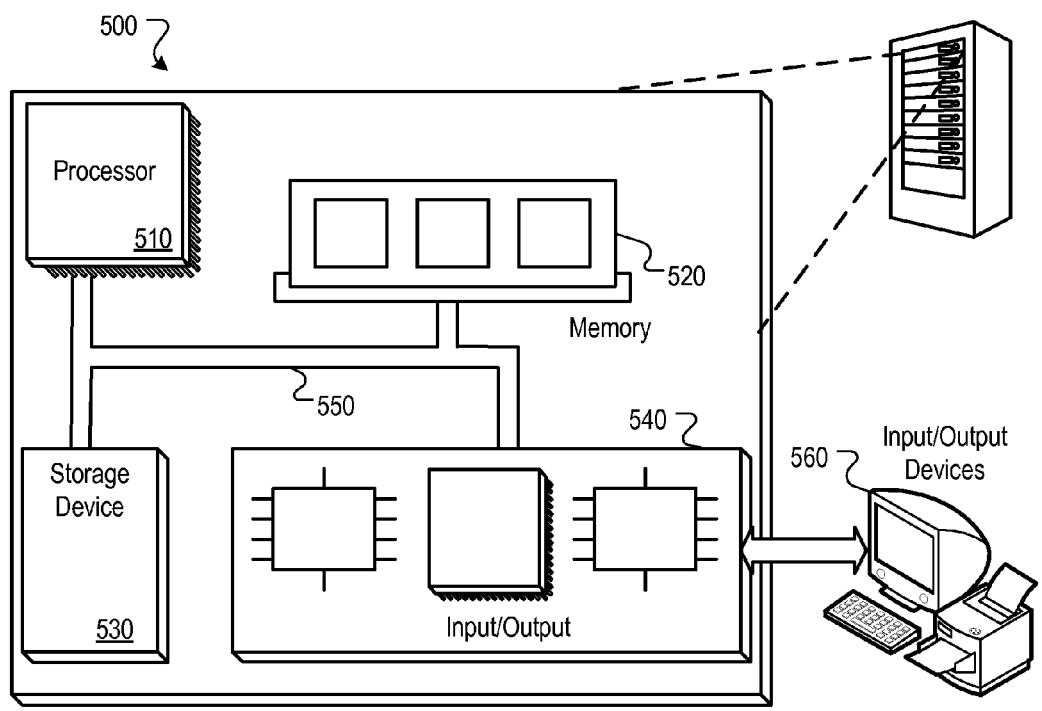
FIG. 5 is a block diagram of a programmable processing system.

An example of one such type of computer is shown in FIG. 5, which shows a block diagram of a programmable processing system (system). The system 500 that can be utilized to implement the systems and methods described herein. The architecture of the system 500 can, for example, be used to implement a computer client, a computer server, or some other computer device.

The system 500 includes a processor 510, a memory 520, a storage device 530, and an input/output device 540. Each of the components 510, 520, 530, and 540 can, for example, be interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can, for example, include a hard disk device, an optical disk device, or some other large capacity storage device.

The input/output device 540 provides input/output operations for the system 500. In one implementation, the input/output device 540 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 560.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by one or more processors, comprising:
   receiving data specifying a rewrite source-rewrite target pair that includes a rewrite source and a rewrite target for the rewrite source;
   identifying one or more first queries that include the rewrite source and one or more second queries that include the rewrite target;
   for each of the one or more first queries:
     identifying a first web document that was referenced by a first search result responsive to the first query and requested through a user interaction with the first search result;
     identifying one or more third queries, different from the first query, each of the one or more third queries being a query for which the first web document was referenced by a third search result responsive to the third query and requested through a user interaction with the third search result;
     selecting third query terms that are included in one or more of the one or more third queries;
   for each of the one or more second queries:
     identifying a second web document that was referenced by a second search result responsive to the second query and requested through a user interaction with the second search result;
     identifying one or more fourth queries, different from the second query, each of the one or more fourth queries being a query for which the second web document was referenced by a fourth search result responsive to the fourth query and requested through a user interaction with the fourth search result;
     selecting fourth query terms that are included in one or more of the one or more fourth queries; and
   determining a similarity score for the rewrite source-rewrite target pair based on a measure of matching terms between the third query terms and the fourth query terms.

2. The method of claim 1, wherein determining a similarity score comprises:
   determining, for each third query term, third query term frequency data that quantify a frequency with which the third query term occurs in the one or more third queries;
   determining, for each fourth query term, fourth query term frequency data that quantify a frequency with which the fourth query term occurs in the one or more fourth queries; and
   determining the similarity score for the rewrite source-rewrite target pair based on a number of the matching terms and the frequencies from the third query term frequency data and the fourth query term frequency data.

3. The method of claim 1, further comprising:
determining an overall similarity score for the rewrite source-rewrite target pair based on the similarity scores for the rewrite source-rewrite target pair for each of the one or more first queries.

4. The method of claim 3, further comprising:
determining a confidence score for each rewrite source-rewrite target pair based on a number of terms included in both the third query terms and the fourth query terms.

5. The method of claim 4, further comprising:
determining that the confidence score is within a threshold range; and
in response to determining that the confidence score is within a threshold range:
identifying additional first queries not in the one or more first queries;
determining similarity scores for the rewrite source-rewrite target pair for the additional first queries; and
adjusting the overall similarity score based on the similarity scores for the rewrite source-rewrite target pair for the additional first queries.

6. The method of claim 1, wherein one or more advertisements responsive to the rewrite target are determined as responsive to the rewrite source.

7. The method of claim 1, wherein the second query includes the same terms as the first query with the rewrite source replaced by the rewrite target.

8. A system comprising:
one or more data processors; and
a computer storage apparatus storing instructions that when executed by the one or more data processors cause the one or more data processors to perform operations comprising:
receiving data specifying a rewrite source-rewrite target pair that includes a rewrite source and a rewrite target for the rewrite source;
identifying one or more first queries that include the rewrite source and one or more second queries that include the rewrite target;
for each of the one or more first queries:
identifying a first web document that was referenced by a first search result responsive to the first query and requested through a user interaction with the first search result;
identifying one or more third queries, different from the first query, each of the one or more third queries being a query for which the first web document was referenced by a third search result responsive to the third query and requested through a user interaction with the third search result;
selecting third query terms that are included in one or more of the one or more third queries;
for each of the one or more second queries:
identifying a second web document that was referenced by a second search result responsive to the second query and requested through a user interaction with the second search result;
identifying one or more fourth queries, different from the second query, each of the one or more fourth queries being a query for which the second web document was referenced by a fourth search result responsive to the fourth query and requested through a user interaction with the fourth search result;
selecting fourth query terms that are included in one or more of the one or more fourth queries; and
determining a similarity score for the rewrite source-rewrite target pair based on a measure of matching terms between the third query terms and the fourth query terms.

9. The system of claim 8, wherein determining a similarity score comprises:
determining, for each third query term, third query term frequency data that quantify a frequency with which the third query term occurs in the one or more third queries;
determining, for each fourth query term, fourth query term frequency data that quantify a frequency with which the fourth query term occurs in the one or more fourth queries; and
determining the similarity score for the rewrite source-rewrite target pair based on a number of the matching terms and the frequencies from the third query term frequency data and the fourth query term frequency data.

10. The system of claim 8, wherein the instructions, when executed by the one or more data processors, cause the one or more data processors to perform further operations comprising:
determining an overall similarity score for the rewrite source-rewrite target pair based on the similarity scores for the rewrite source-rewrite target pair for each of the one or more first queries.

11. The system of claim 10, wherein the instructions, when executed by the one or more data processors, cause the one or more data processors to perform further operations comprising:
determining a confidence score for each rewrite source-rewrite target pair based on a number of terms included in both the third query terms and the fourth query terms.

12. The system of claim 11, wherein the instructions, when executed by the one or more data processors, cause the one or more data processors to perform further operations comprising:
determining that the confidence score is within a threshold range; and
in response to determining that the confidence score is within a threshold range:
identifying additional first queries not in the one or more first queries;
determining similarity scores for the rewrite source-rewrite target pair for the additional first queries; and
adjusting the overall similarity score based on the similarity scores for the rewrite source-rewrite target pair for the additional first queries.

13. The system of claim 8, wherein one or more advertisements responsive to the rewrite target are determined as responsive to the rewrite source.

14. The system of claim 8, wherein the second query includes the same terms as the first query with the rewrite source replaced by the rewrite target.

15. A non-transitory computer-readable storage medium having instructions stored thereon, which, when executed by one or more data processors, causes the one or more data processors to perform operations comprising:
receiving data specifying a rewrite source-rewrite target pair that includes a rewrite source and a rewrite target for the rewrite source;
identifying one or more first queries that include the rewrite source and one or more second queries that include the rewrite target;

for each of the one or more first queries:
  identifying a first web document that was referenced by a first search result responsive to the first query and requested through a user interaction with the first search result;
  identifying one or more third queries, different from the first query, each of the one or more third queries being a query for which the first web document was referenced by a third search result responsive to the third query and requested through a user interaction with the third search result;
  selecting third query terms that are included in one or more of the one or more third queries;
for each of the one or more second queries:
  identifying a second web document that was referenced by a second search result responsive to the second query and requested through a user interaction with the second search result;
  identifying one or more fourth queries, different from the second query, each of the one or more fourth queries being a query for which the second web document was referenced by a fourth search result responsive to the fourth query and requested through a user interaction with the fourth search result;
  selecting fourth query terms that are included in one or more of the one or more fourth queries; and
determining a similarity score for the rewrite source-rewrite target pair based on a measure of matching terms between the third query terms and the fourth query terms.

16. The non-transitory computer-readable storage medium of claim 15, wherein determining a similarity score comprises:
  determining, for each third query term, third query term frequency data that quantify a frequency with which the third query term occurs in the one or more third queries;
  determining, for each fourth query term, fourth query term frequency data that quantify a frequency with which the fourth query term occurs in the one or more fourth queries; and
  determining the similarity score for the rewrite source-rewrite target pair based on a number of the matching terms and the frequencies from the third query term frequency data and the fourth query term frequency data.

17. The non-transitory computer-readable storage medium of claim 15, wherein the instructions, when executed by the one or more data processors, cause the one or more data processors to perform further operations comprising:
  determining an overall similarity score for the rewrite source-rewrite target pair based on the similarity scores for the rewrite source-rewrite target pair for each of the one or more first queries.

18. The non-transitory computer-readable storage medium of claim 17, wherein the instructions, when executed by the one or more data processors, cause the one or more data processors to perform further operations comprising:
  determining a confidence score for each rewrite source-rewrite target pair based on a number of terms included in both the third query terms and the fourth query terms.

19. The non-transitory computer-readable storage medium of claim 18, wherein the instructions, when executed by the one or more data processors, cause the one or more data processors to perform further operations comprising:
  determining that the confidence score is within a threshold range; and
  in response to determining that the confidence score is within a threshold range:
    identifying additional first queries not in the one or more first queries;
    determining similarity scores for the rewrite source-rewrite target pair for the additional first queries; and
    adjusting the overall similarity score based on the similarity scores for the rewrite source-rewrite target pair for the additional first queries.

20. The non-transitory computer-readable storage medium of claim 15, wherein one or more advertisements responsive to the rewrite target are determined as responsive to the rewrite source.

* * * * *